United States Patent
Nakata et al.

(10) Patent No.: US 7,986,031 B2
(45) Date of Patent: Jul. 26, 2011

(54) RESIN MOLDING PART AND MANUFACTURING METHOD THEREOF

(75) Inventors: Mitsuaki Nakata, Chiyoda-ku (JP); Tomonori Abe, Chiyoda-ku (JP); Kosei Tsuji, Chiyoda-ku (JP); Yuhei Awano, Chiyoda-ku (JP); Kazuhiko Yamashita, Chiyoda-ku (JP); Hideo Iinuma, Chiyoda-ku (JP); Iwao Katsuno, Chiyoda-ku (JP); Takayuki Inuzuka, Chiyoda-ku (JP); Akihiro Fujita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 318 days.

(21) Appl. No.: 12/370,999

(22) Filed: Feb. 13, 2009

(65) Prior Publication Data

US 2009/0206457 A1    Aug. 20, 2009

(30) Foreign Application Priority Data

Feb. 15, 2008 (JP) ................... 2008-034421
Dec. 17, 2008 (JP) ................... 2008-321462

(51) Int. Cl.
*H01L 23/52* (2006.01)
(52) U.S. Cl. .................................... 257/666
(58) Field of Classification Search .......... 257/666, 257/685, 687, 100, 433, 434, 667, 787–796, 257/E31.117–E31.118, E51.02, E23.116–E23.14; 438/123–127; 264/272.17
See application file for complete search history.

(56) References Cited

U.S. PATENT DOCUMENTS

| 4,821,413 | A | 4/1989 | Schmitt et al. |
| 5,904,505 | A * | 5/1999 | Hotta et al. ............... 438/124 |
| 6,326,700 | B1 * | 12/2001 | Bai et al. .................. 257/790 |
| 7,514,299 | B2 * | 4/2009 | Lin et al. .................. 438/126 |
| 2007/0080437 | A1 * | 4/2007 | Marimuthu et al. ......... 257/676 |

FOREIGN PATENT DOCUMENTS

| DE | 36 12 576 C1 | 6/1987 |
| JP | 8-39605 | 2/1996 |
| JP | 9-300401 | 11/1997 |
| JP | 11-16663 | 1/1999 |
| JP | 11-198170 | 7/1999 |
| JP | 2000-326359 | 11/2000 |
| JP | 2002-42633 | 2/2002 |
| JP | 2002-186129 | 6/2002 |
| JP | 2003-251655 | 9/2003 |

* cited by examiner

*Primary Examiner* — Wai-Sing Louie
*Assistant Examiner* — Sue Tang
(74) *Attorney, Agent, or Firm* — Oblon, Spivak, McClelland, Maier & Neustadt, L.L.P.

(57) ABSTRACT

A primary molding product is formed by integrally forming a first lead frame and a second lead frame with a primary molding resin portion. In addition, in order to prevent separation of the first lead frame and the second lead frame from the primary molding resin portion, a hook-and-hold portion for preventing separation of the first lead frame from the primary molding resin portion and separation of the second lead frame from the primary molding resin portion is provided on an outer surface of each of the first lead frame and the second lead frame. Thus, a resin molding part capable of achieving suppression of increase in a thickness thereof without deformation or displacement of a lead frame and a manufacturing method thereof can be provided.

4 Claims, 3 Drawing Sheets

(A)

(B)

RESIN MOLDING PART AND MANUFACTURING METHOD THEREOF

BACKGROUND OF THE INVENTION

1. Field of the Invention

The present invention relates to a resin molding part obtained by insert-molding a plurality of parts such as a lead frame with a sealing resin and to a manufacturing method thereof.

2. Description of the Background Art

For a resin molding part obtained by insert-molding a plurality of lead frames with a sealing resin, in order to suppress deformation or displacement of the lead frame due to pressure applied by the resin during molding, a manufacturing method including fabricating a primary molding product by insert-molding a lead frame under low resin pressure and then fabricating a resin molding part through secondary molding by enclosing this primary molding product with a sealing resin has conventionally been employed (Japanese Patent Laying-Open No. 2000-326359).

In addition, a manufacturing method including fabricating a primary molding product by fixing the primary molding product with a holding pin and insert-molding the primary molding product with a sealing resin and fabricating a resin molding part through secondary molding of the primary molding product together with a hole formed by removing the holding pin has also been employed (Japanese Patent Laying-Open No. 2003-251655).

SUMMARY OF THE INVENTION

The resin molding part manufactured as above by insert-molding a plurality of lead frames with a sealing resin has suffered from a problem of deformation or displacement of the lead frame due to a pressure applied by the resin during insert molding. In addition, the manufacturing method including fabricating a primary molding product and then performing secondary molding by enclosing the primary molding product with a sealing resin has suffered from a problem of a large thickness of the resin molding part, as double sealing with the resin is performed.

The present invention was made to solve the above-described problems, and an object of the present invention is to provide a resin molding part capable of achieving suppression of increase in a thickness thereof without deformation or displacement of a lead frame and a manufacturing method thereof.

In the resin molding part and the manufacturing method thereof according to the present invention, a primary molding product is fabricated by arranging a primary molding resin portion having a hook-and-hold portion for first and second lead frames between the first lead frame and the second lead frame opposed to each other and integrally forming the lead frames with the primary molding resin portion, and thereafter secondary molding is performed by enclosing the primary molding product with a secondary molding resin portion. A height of the hook-and-hold portion for the first and second lead frames from the first and second lead frames is equal in dimension to a thickness of the secondary molding resin portion.

According to the resin molding part and the manufacturing method thereof of the present invention, the hook-and-hold portions provided on respective outer surfaces of the first lead frame and the second lead frame for preventing separation of the first lead frame from the primary molding resin portion and separation of the second lead frame from the primary molding resin portion are provided, so that the resin molding part free from deformation or displacement of the first and second lead frames can be obtained. In addition, the height of the hook-and-hold portions for the first and second lead frames from the first and second lead frames is set to be equal in dimension to the thickness of the secondary molding resin portion, so that increase in thickness of the resin molding part can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
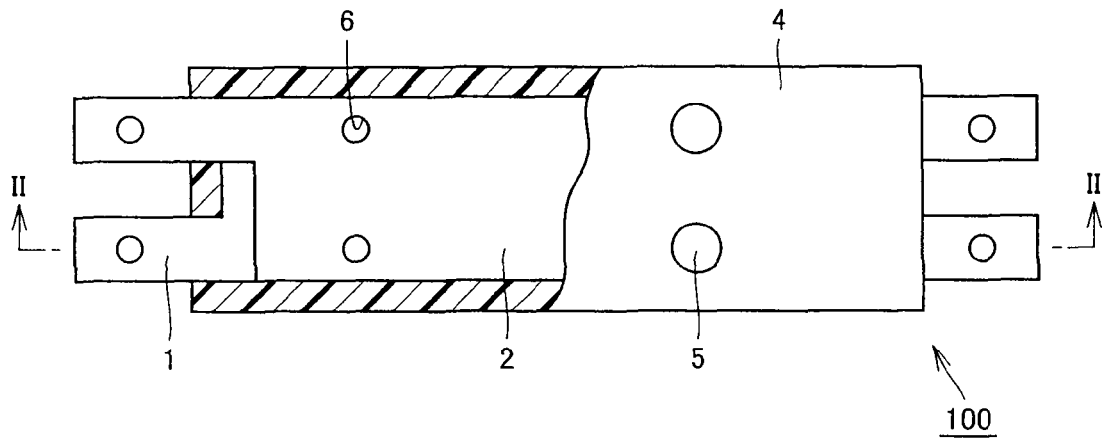
FIG. 1 is a plan view showing a schematic structure of a resin molding part in an embodiment of the present invention.

A resin molding part in each embodiment based on the present invention will be described hereinafter with reference to the drawings. In the description of each embodiment, the same or corresponding elements have the same reference characters allotted, and redundant description may not be repeated.

Figure 2:
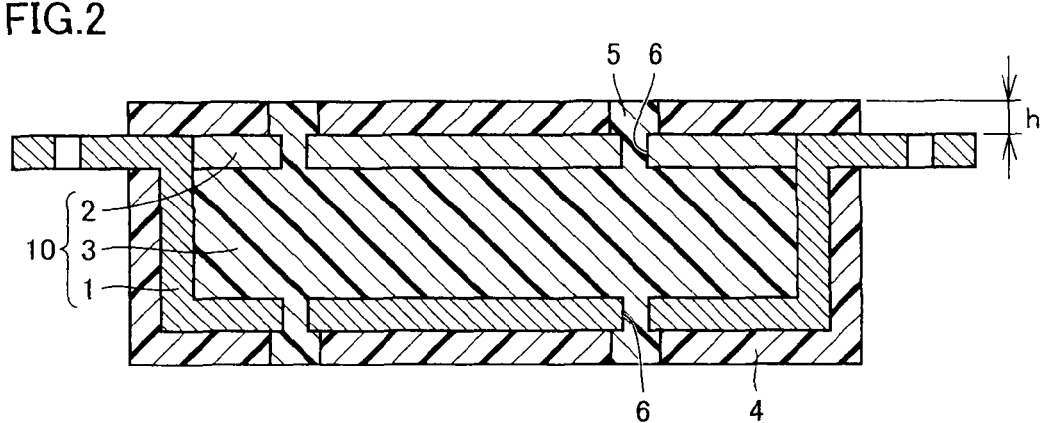
FIG. 2 is a cross-sectional view along the line 11-11 in FIG. 1, when viewed in a direction of an arrow.

Referring to FIGS. 1 and 2, a resin molding part in the embodiment of the present invention will be described. This resin molding part 100 has an integrally formed primary molding product 10 in which a primary molding resin portion 3 is interposed between a first lead frame 1 in an inverted hat shape and a second lead frame 2 in a plate shape arranged opposed to each other such that a distance therebetween is maintained uniform. In addition, this primary molding product 10 is enclosed by a secondary molding resin portion 4.

Though resin molding part 100 in the present embodiment includes two lead frames, it may include three or more lead frames. In addition, PPS (polyphenylene sulfide), PBT (polybutylene terephthalate) or the like used, for example, for sealing and molding an electric part is employed as a resin for primary molding resin portion 3 and secondary molding resin portion 4.

Meanwhile, resins identical in a characteristic or resins different in a characteristic may be employed for primary molding resin portion 3 and secondary molding resin portion 4 respectively. For example, a resin having high rigidity may be applied as the resin for primary molding resin portion 3 in order to suppress deformation due to a pressure applied by the resin during molding of secondary molding resin portion 4. On the other hand, a resin having high toughness may be applied as the resin for secondary molding resin portion 4 in consideration of resistance to thermo cycle.

Primary molding product 10 in the present embodiment is formed by integrally forming first lead frame 1 and second lead frame 2 with primary molding resin portion 3. In addition, in order to prevent separation of first lead frame 1 and second lead frame 2 from primary molding resin portion 3, a hook-and-hold portion 5 is provided on an outer surface of each of first lead frame 1 and second lead frame 2, to prevent separation of first lead frame 1 from primary molding resin portion 3 and separation of second lead frame 2 from primary molding resin portion 3.

Hook-and-hold portion 5 provided on the outer surface of each of first lead frame 1 and second lead frame 2 is coupled to primary molding resin portion 3 through a through hole 6 provided in first lead frame 1 and second lead frame 2. In addition, an outer diameter of hook-and-hold portion 5 is greater than an inner diameter of through hole 6. Thus, hook-and-hold portion 5 achieves an effect of a wedge, so that separation of first lead frame 1 and second lead frame 2 from primary molding resin portion 3 is prevented.

The structure of this hook-and-hold portion 5 is not limited to the structure as shown in FIGS. 1 and 2 above. Hook-and-hold portion 5 may be in any shape, so long as it is provided on the outer surface of first lead frame 1 and second lead frame 2 and it has a function to prevent separation of first lead frame 1 from primary molding resin portion 3 and separation of second lead frame 2 from primary molding resin portion 3.

Figure 3:
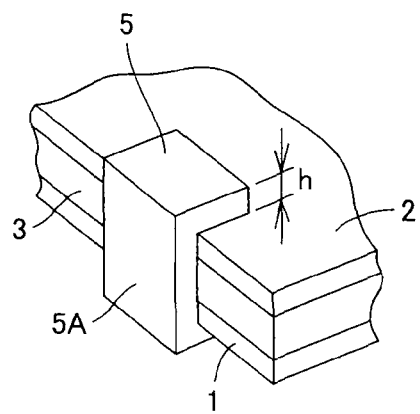
FIG. 3 is a partial enlarged perspective view showing another form of a hook-and-hold portion adopted in the resin molding part in the embodiment of the present invention.

For example, a shape like a clip 5A as shown in FIG. 3 may be adopted. It is noted that FIG. 3 is a partial enlarged perspective view showing another form of the hook-and-hold portion. Such a structure that hook-and-hold portion 5 located on the outer surface of first lead frame 1 and hook-and-hold portion 5 located on the outer surface of second lead frame 2 are arranged on an end surface of primary molding product 10 and hook-and-hold portions 5 are coupled to each other on the end surface side of primary molding product 10 may also be adopted. Specifically, such an example that L-shaped clips 5A are engaged with each other from an outer side of the end surface of primary molding product 10 may be employed.

Alternatively, such a structure that a notch region is provided in each of first lead frame 1 and second lead frame 2 and the notch region is filled with primary molding resin portion 3 so that first lead frame 1 and second lead frame 2 are not separated from primary molding resin portion 3 may be adopted.

For example, hook-and-hold portion 5 in the present embodiment is in a columnar shape on the outer surface of each of first lead frame 1 and second lead frame 2. In addition, a height (h) of hook-and-hold portion 5 is equal to a thickness of secondary molding resin portion 4 enclosing first lead frame 1 and second lead frame 2. In the present embodiment, though hook-and-hold portion 5 is in a columnar shape, the shape thereof is not limited as such and it may be in a shape of a parallelepiped or the like.

Figure 4:
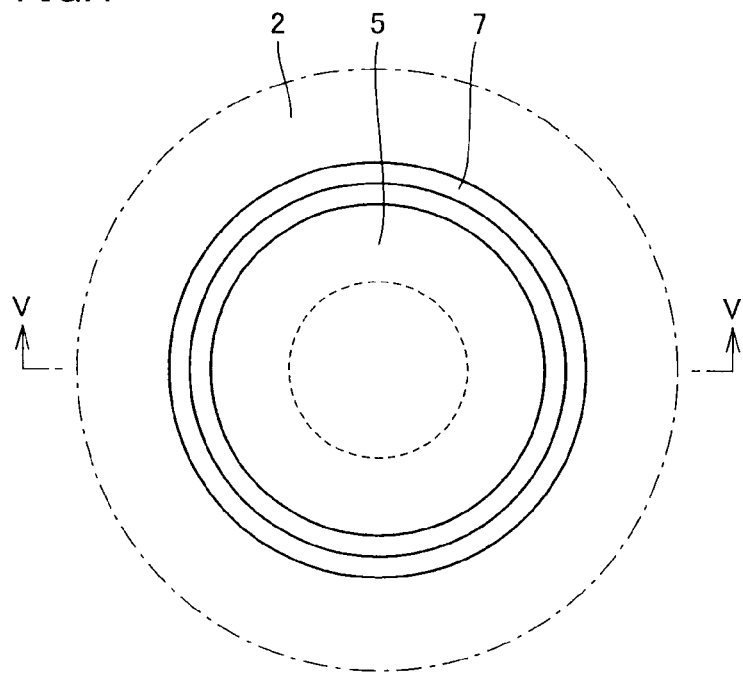
FIG. 4 is a diagram showing details of a structure of a meltable portion adopted in the resin molding part in the embodiment of the present invention.
Figure 5A:
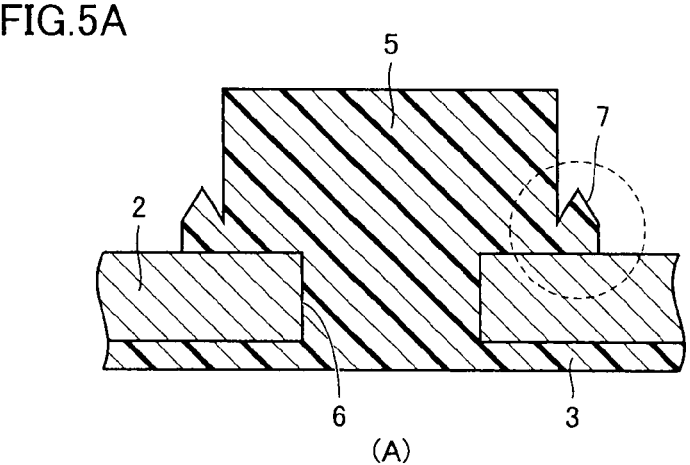
FIG. 5A is a cross-sectional view along the line V-V in FIG. 4, when viewed in a direction of an arrow.
Figure 5B:
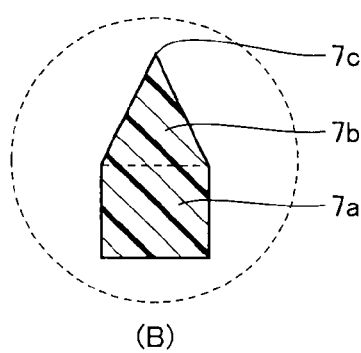
FIG. 5B is an enlarged view of the meltable portion.

Preferably, hook-and-hold portion 5 for first lead frame 1 and second lead frame 2 has a meltable portion 7 as shown in FIGS. 4, 5A and 5B. FIG. 4 is a diagram showing details of a structure of meltable portion 7, FIG. 5A is a cross-sectional view along the line V-V in FIG. 4 when viewed in a direction of an arrow, and FIG. 5B is an enlarged view of meltable portion 7. This meltable portion 7 is formed integrally with hook-and-hold portion 5. Meltable portion 7 has a cross-section in a small chevron shape and it is arranged to surround hook-and-hold portion 5.

Meltable portion 7 in a chevron shape includes a quadrangular portion 7a provided on the side of first lead frame 1 and second lead frame 2 and a triangular portion 7b having a width decreasing in a direction away from first lead frame 1 and second lead frame 2. Triangular portion 7b is spaced apart from hook-and-hold portion 5, and it has a vertex 7c on the side away from first lead frame 1 and second lead frame 2. Vertex 7c is located at a position lower than the height of hook-and-hold portion 5.

Quadrangular portion 7a has a side in contact with a side surface of hook-and-hold portion 5 and a bottom side in contact with first lead frame 1 and second lead frame 2. These triangular portion 7b and quadrangular portion 7a are smaller in size than hook-and-hold portion 5, and for example in a cross-section in FIGS. 5A and 5B, triangular portion 7b has a width in a range from approximately 0.3 mm to 0.8 mm and a height in a range from approximately 0.4 mm to 11.0 mm, in contrast to hook-and-hold portion 5 having a lateral width in a range from approximately 3 mm to 10 mm and a height in a range from approximately 2 mm to 4 mm.

Here, in secondary molding, secondary molding is performed such that integrally formed primary molding product 10 is enclosed by secondary molding resin portion 4. Meltable portion 7 above, however, has triangular portion 7b distant from hook-and-hold portion 5 and having a decreasing width, and hence, triangular portion 7b has a small heat capacity with respect to a surface area and it is likely to melt by transferred heat.

Consequently, meltable portion 7 is molten by heat of a molten sealing resin and it is mixed together with the sealing resin of secondary molding resin portion 4 and solidified. Thus, hook-and-hold portion 5 and secondary molding resin portion 4 are fused around hook-and-hold portion 5. Consequently, sealing and insulation property between hook-and-hold portion 5 and secondary molding resin portion 4 can be improved.

Namely, hook-and-hold portion 5 has meltable portion 7 that can be molten by the sealing resin during secondary molding, and this meltable portion 7 is located at a position in contact with secondary molding resin portion 4 during secondary molding and formed to surround hook-and-hold portion 5. Therefore, a gap between primary molding resin portion 3 and secondary molding resin portion 4 is sufficiently sealed with meltable portion 7.

In addition, primary molding resin portion 3 except for meltable portion 7 has a heat capacity with respect to a surface area sufficiently larger than that of meltable portion 7, and melting thereof during secondary molding is hardly likely except for the very surface. Therefore, a molding product with good precision and free from deformation can be obtained.

In the present embodiment, one-deep meltable portion 7 is adopted, however, sealing performance can further be improved by adopting multiple-deep meltable portions 7. In addition, in the present embodiment, though meltable portion 7 is formed in a small chevron shape, the shape thereof is not limited to such a chevron shape so long as a similar function is attained.

Moreover, as primary molding product 10 is obtained by integrally forming two lead frames 1 and 2 with primary molding resin portion 3, rigidity is higher and deformation is less likely than in an example including a single lead frame.

(Method of Manufacturing Resin Molding Part)

A method of manufacturing the resin molding part in the present embodiment will now be described with reference to FIGS. 6 and 7.

Figure 6:
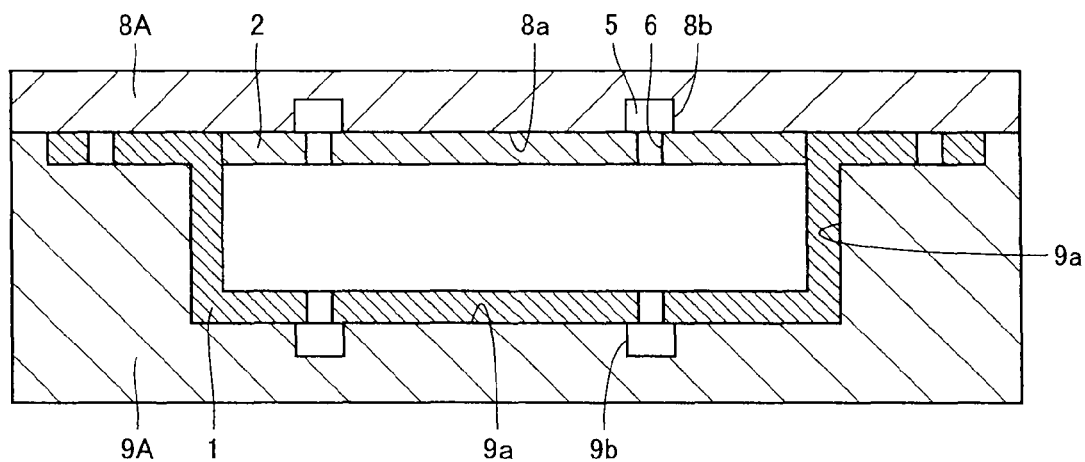
FIG. 6 is a schematic diagram showing a method of manufacturing a primary molding product of the resin molding part in the embodiment of the present invention.

Referring first to FIG. 6, the resin is introduced in between first lead frame 1 and second lead frame 2, so as to mold primary molding resin portion 3 isolating first lead frame 1 and second lead frame 2 from each other with the resin. Here, hook-and-hold portion 5 for fixing first lead frame 1 and second lead frame 2 to primary molding resin portion 3 is simultaneously formed on primary molding resin portion 3. Thus, primary molding product 10 including integrally formed first lead frame 1 and second lead frame 2 can be obtained.

Here, first lead frame 1 and second lead frame 2 are set in contact with cavity surfaces 8a and 9a of an upper mold 8A and a lower mold 9A respectively, such that a direction of thickness of first lead frame 1 and second lead frame 2 is perpendicular to cavity surfaces 8a and 9a of respective upper mold 8A and lower mold 9A.

Thus, resin pressure in resin introduction is applied to press first lead frame 1 and second lead frame 2 against cavity surfaces 8a and 9a of respective upper mold 8A and lower mold 9A. Consequently, deformation or displacement of first lead frame 1 and second lead frame 2 is less likely, and primary molding product 10 can be fabricated with good dimension accuracy.

Displacement can further be prevented, for example, by providing a hole for registration in first lead frame 1 and second lead frame 2 and a protrusion for registration in upper mold 8A and lower mold 9A. It is noted that a contact surface of each of first lead frame 1 and second lead frame 2 pressed against the cavity surface of upper mold 8A and lower mold 9A is not covered with the primary molding resin.

In addition, for example, an annular recess portion 8b, 9b is provided at a position communicating with through hole 6 provided in each of first lead frame 1 and second lead frame 2, in a part of the surface on the cavity side of each of upper mold 8A and lower mold 9A for fabricating primary molding product 10. An area of opening of recess portion 8b, 9b is greater than an area of opening of through hole 6.

Thus, the primary molding resin is introduced into recess portion 8b, 9b through hole 6, to thereby form hook-and-hold portion 5 communicating with a resin portion supplied in between first lead frame 1 and second lead frame 2.

In addition, by forming a recess portion for forming hook-and-hold portion 5 around an end portion of first lead frame 1 and second lead frame 2, clip 5A serving as the hook-and-hold portion as shown in FIG. 3 can be formed instead of providing through hole 6 in first lead frame 1 and second lead frame 2. Moreover, by forming a groove portion in the vicinity of recess portions 8b and 9b of respective upper mold 8A and lower mold 9A for forming hook-and-hold portion 5, meltable portion 7 as shown in FIGS. 4, 5A and 5B can simultaneously be molded.

Figure 7:
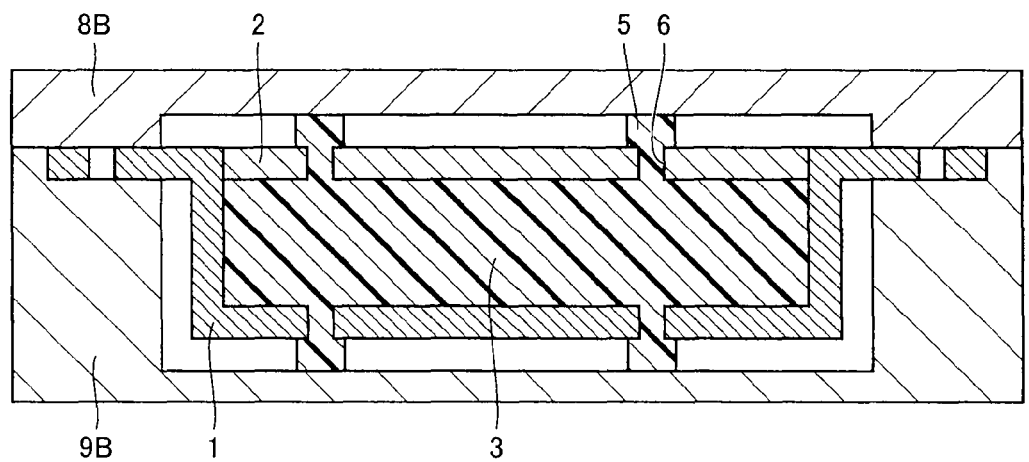
FIG. 7 is a schematic diagram showing a method of manufacturing a secondary molding product of the resin molding part in the embodiment of the present invention.

Referring next to FIG. 7, a method of manufacturing a secondary molding product in the present embodiment will be described. According to the manufacturing method in the present embodiment, primary molding product 10 is arranged in a cavity of an upper mold 8B and a lower mold 9B and enclosed by a resin, to complete secondary molding. Thus, secondary molding resin portion 4 as shown in FIG. 2 is formed.

Here, projecting hook-and-hold portion 5 formed in primary molding is held in contact with an inner surface of a cavity of upper mold 8B and lower mold 9B. Thus, the surface of first lead frame 1 and second lead frame 2 not covered with primary molding resin portion 3 is held at a prescribed distance from the inner surface of the cavity. Namely, hook-and-hold portion 5 formed on primary molding resin portion 3 serves as a spacer in arranging primary molding product 10 in upper mold 8B and lower mold 9B during secondary molding and serves to prevent deformation or displacement of primary molding product 10 due to pressure in introduction of the resin.

In addition, by thus performing secondary molding, secondary molding resin portion 4 covering first lead frame 1 and second lead frame 2 has a thickness equal to the height of hook-and-hold portion 5 from the outer surface of first lead frame 1 and second lead frame 2. The resin molding part formed with conventional secondary molding has suffered from a problem of a large thickness thereof, because double enclosure with the resin is performed in primary molding and secondary molding. In the present embodiment, however, as secondary molding resin portion 4 can be molded to have a thickness as large as hook-and-hold portion 5 for first lead frame 1 and second lead frame 2 formed in primary molding, increase in thickness of the resin part can be prevented.

Here, the thickness of secondary molding resin portion 4 is equal to the height of hook-and-hold portion 5 from the outer surface of first lead frame 1 and second lead frame 2, however, the thickness of the secondary molding resin portion does not necessarily have to be uniform in its entirety. If the thickness of secondary molding resin portion 4 is equal to the height of hook-and-hold portion 5 from the outer surface of first lead frame 1 and second lead frame 2 at least in a part in contact with hook-and-hold portion 5 formed in primary molding, hook-and-hold portion 5 serves as a spacer during secondary molding and serves to prevent deformation or displacement of the primary molding product due to the pressure applied in introduction of the resin.

As described above, according to the manufacturing method in the present embodiment, in primary molding, first lead frame 1 and second lead frame 2 are set to be in contact with the cavity surfaces of respective upper mold 8A and lower mold 9A such that a direction of thickness of first lead frame 1 and second lead frame 2 is perpendicular to the cavity surfaces of respective upper mold 8A and lower mold 9A, and thereafter the primary molding resin is introduced in between the lead frames. The primary molding resin portion is thus formed between the lead frames.

Thus, resin pressure in resin introduction is applied to press first lead frame 1 and second lead frame 2 against cavity surfaces 8a and 9a of respective upper mold 8A and lower mold 9A. Consequently, deformation or displacement of first lead frame 1 and second lead frame 2 is less likely, and primary molding product 10 can be fabricated with good dimension accuracy.

Displacement can further be prevented, for example, by providing a hole for registration in first lead frame 1 and second lead frame 2 and a protrusion for registration in upper mold 8A and lower mold 9A. It is noted that a contact surface of each of first lead frame 1 and second lead frame 2 pressed against the cavity surface of upper mold 8A and lower mold 9A is not covered with the primary molding resin.

In addition, the method of manufacturing primary molding product 10 is not limited to the method of forming primary molding resin portion 3 by introducing the primary molding resin in between first lead frame 1 and second lead frame 2. For example, primary molding resin portion 3 having a hook-and-hold portion as shown in FIGS. 4, 5A and 5B, that has a height from the lead frame as large as the thickness of the secondary molding resin portion, may be molded in advance as a part, and first lead frame 1 and second lead frame 2 may then be hooked and held thereon, to thereby complete primary molding product 10.

In this case, as a lead frame is absent at the time when the primary molding product is formed, deformation of the lead frame does not occur. In addition, in hooking and holding the lead frame on the primary molding product, the surface of the lead frame on the side of the primary molding product is brought into intimate contact with the primary molding product and secondary molding is performed in that state. Therefore, displacement of the lead frame from the primary molding product is unlikely during secondary molding and deformation of the lead frame is less likely.

As described above, the present invention is directed to a method of manufacturing a resin molding part by covering a plurality of parts with resin through insert-molding, and the manufacturing method includes a first insert-molding step of supplying a resin in between parts while each part is brought in intimate contact with a mold for insert-molding and forming a hook-and-hold portion communicating with a resin portion supplied in between the parts on a surface side of the part in intimate contact with the mold, and a second insert-molding step of bringing the hook-and-hold portion formed in the first insert-molding step into intimate contact with a mold and performing insert-molding.

By adopting this manufacturing method, a resin part in which deformation or displacement during insert-molding is less likely can be fabricated. In addition, increase in thickness of the resin molding part can be prevented. Moreover, as a part of the primary molding resin functions as a spacer during secondary molding, it is not necessary to prepare a spacer separately in secondary molding and manufacturing is facilitated.

If a resin used in primary molding is softened during secondary molding, hook-and-hold portion 5 serving as the spacer may deform and working accuracy in secondary molding may lower. Therefore, a resin material having a softening temperature in primary molding higher than a molding temperature in secondary molding is employed, so that working accuracy can be stable.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A resin molding part, comprising:
   a primary molding product including a first lead frame and a second lead frame arranged opposed to each other; and
   a sealing resin enclosing said primary molding product through insert-molding,
   said primary molding product having
   a primary molding resin portion provided in a manner sandwiched between said first lead frame and said second lead frame, and
   a hook-and-hold portion provided on an outer surface of each of said first lead frame and said second lead frame and provided to prevent separation of said first lead frame from said primary molding resin portion and separation of said second lead frame from said primary molding resin portion, and
   said sealing resin having a secondary molding resin portion having a thickness equal to a height of said hook-and-hold portion from the outer surface of said first lead frame and said second lead frame.

2. The resin molding part according to claim 1, wherein
   said hook-and-hold portion has a meltable portion that can be molten by the sealing resin of said secondary molding resin portion, and
   said meltable portion is provided to surround said hook-and-hold portion at a position in contact with the sealing resin of said secondary molding resin portion.

3. The resin molding part according to claim 1, wherein
   said hook-and-hold portion located on the outer surface of said first lead frame and said hook-and-hold portion located on the outer surface of said second lead frame are provided to communicate with each other at an end surface of said primary molding product.

4. The resin molding part according to claim 1, wherein
   said hook-and-hold portion communicates with said primary molding resin portion through a through hole that passes through said first lead frame and said second lead frame.

\* \* \* \* \*